(12) United States Patent
Bosch

(10) Patent No.: US 11,155,022 B2
(45) Date of Patent: Oct. 26, 2021

(54) DEVICE, MOULD ASSEMBLY AND METHOD FOR THERMOFORMING OF A PRODUCT FROM A PLASTIC FILM

(71) Applicant: BOSCH SPRANG B.V., DA Sprang-Capelle (NL)

(72) Inventor: Antoni Bosch, Sprang-Capelle (NL)

(73) Assignee: BOSCH SPRANG BV, Da Sprang-Capelle (NL)

( * ) Notice: Subject to any disclaimer, the term of this patent is extended or adjusted under 35 U.S.C. 154(b) by 119 days.

(21) Appl. No.: 15/573,667

(22) PCT Filed: Apr. 5, 2016

(86) PCT No.: PCT/NL2016/050233
§ 371 (c)(1),
(2) Date: Nov. 13, 2017

(87) PCT Pub. No.: WO2017/176110
PCT Pub. Date: Oct. 12, 2017

(65) Prior Publication Data
US 2019/0016038 A1    Jan. 17, 2019

(51) Int. Cl.
*B29C 51/30* (2006.01)
*B29C 51/04* (2006.01)
(Continued)

(52) U.S. Cl.
CPC ............ *B29C 51/306* (2013.01); *B29C 51/04* (2013.01); *B29C 51/08* (2013.01); *B29C 51/262* (2013.01);
(Continued)

(58) Field of Classification Search
CPC ....... B29C 51/306; B29C 51/36; B29C 51/08; B29C 51/262; B29C 51/04; B29C 51/32; B29C 2791/006; B29C 2791/007
See application file for complete search history.

(56) References Cited

U.S. PATENT DOCUMENTS 3,357,053 A    12/1967  Lyon
4,383,815 A *  5/1983  Kiefer .................... B29C 33/04
                                                  425/387.1
(Continued)

FOREIGN PATENT DOCUMENTS

FR    2139764 A1    1/1973
GB    1140041 A     1/1969
WO    2014112876 A2 7/2014

OTHER PUBLICATIONS

International Preliminary Report on Patentability dated Oct. 18, 2018 re: Application No. PCT/NL2016/050233, pp. 1-9.
(Continued)

*Primary Examiner* — Seyed Masoud Malekzadeh
(74) *Attorney, Agent, or Firm* — Tarolli, Sundheim, Covell & Tummino LLP

(57) ABSTRACT

A device and method for thermoforming of a product from a plastic film includes a mould assembly which is used in such a device. The plastic film is clamped between the mould parts in primary and secondary manner. The forming process can hereby be divided into more or less independent zones. Different forming techniques, positive or negative, can be used in the different zones. This makes it possible to combine the advantages of the two techniques in one forming process.

21 Claims, 9 Drawing Sheets

(51) Int. Cl.
    B29C 51/08    (2006.01)
    B29C 51/36    (2006.01)
    B29C 51/32    (2006.01)
    B29C 51/26    (2006.01)
(52) U.S. Cl.
    CPC .............. *B29C 51/36* (2013.01); *B29C 51/32* (2013.01); *B29C 2791/006* (2013.01); *B29C 2791/007* (2013.01)

(56) References Cited

U.S. PATENT DOCUMENTS

| | | | |
|---|---|---|---|
| 8,685,300 B2 * | 4/2014 | Bosch | A01G 9/021 |
| | | | 264/163 |
| 10,576,681 B2 * | 3/2020 | Smeulders | B29C 51/265 |
| 10,800,090 B2 * | 10/2020 | Van Tilborgh | B29C 51/32 |
| 2012/0061873 A1 * | 3/2012 | Bosch | B65D 1/40 |
| | | | 264/163 |
| 2016/0271862 A1 * | 9/2016 | Smeulders | B29C 51/32 |
| 2016/0361837 A1 * | 12/2016 | Hayes | B29C 51/10 |
| 2017/0320257 A1 * | 11/2017 | Van Tilborgh | B29C 51/266 |

OTHER PUBLICATIONS

International Search Report dated Dec. 7, 2016 re: Application No. PCT/NL2016/050233; pp. 1-3.
Written Opinion dated Dec. 7, 2016 re: Application No. PCT/NL2016/050233; pp. 1-7.

* cited by examiner

DEVICE, MOULD ASSEMBLY AND METHOD FOR THERMOFORMING OF A PRODUCT FROM A PLASTIC FILM

The present invention relates to a device and method for thermoforming of a product from a plastic film. The invention further relates to a mould assembly which is used in such a device.

BACKGROUND

Thermoforming is a known technique. It makes use of the fact that with sufficient heating the form of thermoplastic materials such as polypropylene (PP), polystyrene (PS) or polyethylene (PET) can be changed.

A typical thermoforming device for forming the heated material comprises two mould parts, an upper and lower mould, wherein the heated plastic material, preferably in the form of a film, is introduced between the two moulds.

When the mould parts have been moved toward each other the plastic material is carried into the forming cavities of the mould, optionally by a pre-stretcher. A pre-stretcher is applied in products with a determined height and to obtain a good material distribution. An increased pressure is then applied to press the plastic against the wall and the base of the forming cavity. The base and wall of the forming cavity are referred to as forming parts. Because the wall and the base of the cavity are kept at relatively low temperature, the plastic will take on a solid form. The combination of upper and lower mould usually comprises a plurality of forming cavities.

Diverse products are formed with the thermoforming technique in question, such as plastic cups, covers, flowerpots and packaging trays.

In the present prior art a mould assembly is constructed with forming parts in only one mould part. This mould part can be both the lower mould and the upper mould.

According to the prior art, a product can be formed negatively or positively. In the negative forming, shown in FIG. 1, a film 1 is introduced between an upper mould 2 and a lower mould 3. Arranged in upper mould 2 is a pre-stretcher 4 which presses film 1 into a forming part 5 in lower mould 3 by means of a downward movement. Compressed air is also supplied via conduit 6 in order to press film 1 against the wall of forming part 5. The air which is enclosed between forming part 5 and film 1 can be discharged via discharge conduit 7.

In the positive forming, shown in FIG. 2, a film 1 is introduced between an upper mould 2 and lower mould 3. Film 1 is arranged here over a forming part 5. Compressed air can also be supplied here via a conduit 6 and enclosed air can leave the space via a discharge conduit 7.

In the positive forming the inner side of the product will depend on the form of the forming part. During cooling of the film it will contract slightly, whereby the film comes to lie very tightly on the forming part. As a result, the inner side of the product can be formed in precise manner.

In the negative forming the outer side of the product will depend on the form of the forming part. The product can also be pressed or calibrated by a component in the mould, such as a hold-down element, which is situated in a different mould part than the forming part. Compressed air can also be used to carry the film against the forming part. With this technique it is thus possible to form the outer side of the product more precisely.

An advantage of the negative forming is that a well-defined material distribution can be achieved in the formed product with this technique. This technique can for instance be used to form relatively high covers with a relatively constant wall thickness.

A cover is often used to be clamped onto a cup so that a closed container is obtained, for instance for holding hot drinkable liquids. The inner side of the cover rim determines the fit on the cup here. Variations in the film thickness therefore have an effect on the fit of the cover on the cup. Because a precise fit is often required, especially in the case of a cup with a hot liquid, variations in the fit of the cover are undesirable.

For a cover with a determined height it is recommended to form it negatively in combination with a pre-stretcher in order to thus obtain a good material distribution. A good material distribution is desired in order to form a product of good quality, wherein the product can be formed with the smallest possible amount of film.

A drawback of negative forming is that the film tends to contract inwardly away from the forming part during cooling, whereby the film will cool off less and a determined residual heat will remain in the film. Due to this residual heat the product contracts further still, which influences the forming of the rim. This then has a negative effect on the final size of the cover rim and the fit thereof.

It may therefore be recommended to form a cover positively so as to thereby shape the cover rim more effectively than with negative forming, since the film contracts tightly around the forming part and thereby cools off. In the positive forming the difference in film thickness has no effect on the inner side of the cover and on the fit of the cover on the cup.

A drawback of positive forming is however that during placing of the film around or over the forming part the film already comes into contact with this forming part. The film will therefore cool off during placing, whereby it is more difficult to obtain a good material distribution. The part of the film which comes into contact with the forming part first is usually the thickest. In order to obviate this problem use is usually made of a relatively large amount of film material in order to be able to guarantee a determined minimal thickness of the cover.

SUMMARY OF THE INVENTION

It is an object of the present invention to provide a solution which makes it possible to combine the positive characteristics of negative and positive forming. It is more particularly an object of the present invention to provide a solution wherein a product, such as a cover, can be manufactured with an at least locally precisely defined inner dimension and wherein a minimum of film material can be used.

A device for thermoforming a product in accordance with the preamble of claim 1 is known from WO 2014/112876A2.

According to a first aspect, this object is achieved by means of a thermoforming device as defined in claim 1, which comprises a first mould part provided with a first forming part, this first forming part being configured to form a first part of the product. The device further comprises a second mould part provided with a second forming part, this second forming part being configured to form a second part of the product which is integrally connected to the first part, wherein the first forming part and the second forming part can co-act for the purpose of forming a secondary clamping of the film. The first and second mould part are movable relative to each other for the purpose of providing a primary clamping of plastic film, arranged between the first and second mould part, at a distance from the first and second forming part. The device further comprises a pressure system configured to apply a first pressure difference over the plastic film situated between the primary and secondary clamping for the purpose of carrying the plastic film to the second forming part, and to apply a second pressure difference over the plastic film situated inside the secondary clamping for the purpose of carrying the plastic film to the first forming part.

According to the present invention, use is made during forming of a primary and secondary clamping. The forming process can hereby be divided into more or less independent zones, i.e. a first zone inside the secondary clamping and a second zone between the primary and secondary clamping. A different type of forming, negative or positive, can be used inside these zones. It thus becomes possible hereby to combine the positive characteristics of the different forming processes in one single operating cycle. The invention does not preclude the forming of further zones. A third zone could thus be formed by means of a tertiary clamping.

According to the invention, the first mould part comprises a first cavity in which the first forming part is placed and the second mould part comprises a second cavity in which the second forming part is placed.

According to the invention, at least one of the first forming part and the second forming part is received movably in the first or second cavity, respectively. The first forming part and the second forming part are movable relative to each other here for the purpose of said forming of the secondary clamping of the film. The device further comprises a control unit for controlling the relative movement of the first and second mould part and/or the relative movement of the first and second forming part. The control unit is configured here to first achieve the primary clamping and then achieve the secondary clamping.

The present invention makes it possible for a product to be formed, wherein a part of the product is formed in the first mould part and another part of the product in the second mould part. It is thus possible here to form a cover rim positively so that the variations in film thickness do not influence the fit of the cover and so that a better clamping is obtained, and to form the rest of the cover negatively in order to obtain a good material distribution, whereby it is possible to use less film.

The above stated known device only has one simultaneous clamping of the film. This in contrast to the device according to the invention, which has a primary and secondary clamping. The forming surface can hereby be better defined, whereby the forming process becomes more reliable. With the device according to the invention it becomes possible to first clamp the film and only then pre-stretch the film. This prevents film which should not actually have been used being carried along into the forming cavity. The product which is manufactured using the device according to the invention thus has a more constant weight and dimensions.

A further advantage for the primary and secondary clamping according to the invention relates to deforming of the product. In the above stated known device the mould opens and the secondary forming part is thus displaced upward at the same time as the clamping. A drawback hereof is that the product remains stuck on the secondary forming part. This is because the product has contracted around the positive secondary forming part. The product will have to be 'deformed' or it will have to be detached from the secondary forming part. According to the invention, this deforming problem is solved by providing a primary and secondary clamping which can be actuated separately of each other.

According to the invention, the secondary forming part, over which the product is positively formed, can be retracted first. This is possible because the product is still retained by the primary clamping. After the secondary forming part has been deformed the primary clamping can also be opened, for instance by allowing the mould to open, and the product can be knocked out.

Thermoforming film has a determined variation in thickness. By performing the clamping of the film in one step, as in the known device, there is a greater chance that an unreliable clamping is obtained as a result of the thickness variation in the film. This can result in leakage of forming air. By driving the primary and secondary clamping separately of each other a more reliable clamping can be realized, which provides for more control over the process and whereby the product is better defined.

It is possible for the first mould part and the first forming part to form an integral whole. It is also possible for the second mould part and the second forming part to form an integral whole. After the secondary clamping has been achieved a first chamber can be at least partially bounded by the second forming part and the plastic film situated inside the secondary clamping. In addition to this or instead of this, after the primary and secondary clamping have been achieved a second chamber can be at least partially bounded by the first forming part and/or a wall of the first cavity and the plastic film situated between the primary and secondary clamping. The pressure system can be configured to apply a pressure difference between a pressure in the first and second chamber and a pressure prevailing on another side of the film at the position of the first and second chamber, respectively.

The first and second forming cavities, and more particularly the walls thereof, and the first and second forming parts themselves are embodied such that the first and second chambers can be formed. The required force whereby the film is carried to the relevant forming part can be provided in these chambers by means of the pressure system.

The pressure system can provide the force required for moving the film to the forming parts by means of a system for arranging a gaseous medium under pressure, such as compressed air, in the first and/or second chamber. It is recommended here for the first and/or second chamber to take a substantially airtight form. The pressure system can comprise for this purpose one or more channels for supplying the gaseous medium under pressure to the first and/or second chamber. The one or more channels for supplying gaseous medium under pressure to the first chamber can be arranged in the second forming part and/or a wall of the second cavity. The one or more channels for supplying gaseous medium under pressure to the second chamber can further be arranged in the first forming part and/or a wall of the first cavity. The pressure system can also comprise one or more channels for discharging gaseous medium, such as air, which is enclosed on said other side of the film at the position of the first and second chamber, respectively.

The first and second mould part can be movable relative to each other in a first direction. The product can further comprise a longitudinal axis which is parallel to the first direction, at least during forming of the product. The product can in such a case comprise an inner part with respect to the longitudinal axis, and an outer part which is integrally connected to the inner part. The inner part can correspond here to the first part and the outer part to the second part. The first part can for instance comprise a central part of the product and the second part a rim part which is integrally connected thereto. The rim part can wholly enclose the central part here.

In an embodiment the first forming part is configured to negatively form the first part of the product and the second forming part is configured to positively form the second part of the product. The first forming part can define a forming cavity here for said negative forming of the first part of the product.

The second forming part can take a substantially hollow form. This allows a wall of the second forming part to engage during said secondary clamping via the plastic film on a stop which is formed in a wall of the first cavity or to engage on a stop formed in the first forming part. In addition or instead of this it is possible for the second forming part to take a sleeve-like form. The walls of the sleeve-like second forming part can at least partially form the walls of the first chamber here.

The first forming part can be configured to negatively form the first part. The device can further comprise a pre-stretcher which is received movably in the second forming part. This pre-stretcher can be configured to move the plastic film toward the first forming part during operation and preferably after the primary and secondary clamping have been achieved. It can be possible here that the pre-stretcher and the second forming part can move independently of each other, wherein the pre-stretcher and the second forming part are preferably disposed coaxially.

In contrast to the above stated known device, an embodiment of the present invention comprises a pre-stretcher. This pre-stretcher makes it possible to obtain a better material distribution in the forming cavity.

The pressure system can comprise one or more channels for discharging gaseous medium which is enclosed inside the secondary clamping between the film and the first forming part and/or which is enclosed between the primary and secondary clamping and between the second forming part and the film. Said one or more channels for discharging gaseous medium between the film and the first forming part can be received in a wall of the first cavity and/or in the first forming part. In addition or instead of this the one or more channels for discharging gaseous medium between the film and the second forming part can be received in a wall of the second cavity and/or in the second forming part. These stated channels can be connected to a vacuum system. The invention thus provides for the film being sucked toward a forming part and the film being pressed toward a forming part. These techniques can otherwise be applied in combination.

At least one of the first mould part and the second mould part can take a stationary form.

According to a second aspect, the invention provides a mould assembly for thermoforming of a product from a plastic film, which mould assembly comprises the first and second mould parts as described above.

According to a third aspect, the invention provides a method for thermoforming of a product from a plastic film, which comprises the steps of:

providing a first mould part which comprises a first forming part, this first forming part being configured to form a first part of the product;

providing a second mould part which comprises a second forming part, this second forming part being configured to form a second part of the product which is integrally connected to the first part;

moving the first and second mould part relative to each other for the purpose of providing a primary clamping of a plastic film, arranged between the first and second mould part, at a distance from the first and second forming part;

forming a secondary clamping of the film with the first forming part and second forming part;

applying a first pressure difference over the plastic film situated between the primary and secondary clamping for the purpose of carrying the plastic film to the second forming part; and applying a second pressure difference over the plastic film situated inside the secondary clamping for the purpose of carrying the plastic film to the first forming part.

The first mould part can comprise a first cavity in which the first forming part is placed and the second mould part can comprise a second cavity in which the second forming part is placed. After the secondary clamping has been achieved a first chamber is here at least partially bounded by the second forming part and the plastic film situated inside the secondary clamping, and/or after the primary and secondary clamping have been achieved a second chamber is at least partially bounded by the first forming part and/or a wall of the first cavity and the plastic film situated between the primary and secondary clamping. The method can further comprise of applying a pressure difference between a pressure in the first and second chamber and a pressure prevailing on another side of the film at the position of the first and second chamber, respectively.

At least one of the first forming part and the second forming part is received movably in the first or second cavity, respectively, and the stated forming of the secondary clamping comprises of moving the first and second forming part relative to each other and subsequently clamping the film between the first and second forming part. The relative movement of the first and second forming part is performed here after the primary clamping has been achieved.

BRIEF DESCRIPTION OF DRAWINGS

The present invention will be elucidated in more detail hereinbelow with reference to the accompanying figures, wherein.

DETAILED DESCRIPTION

Figure 1:
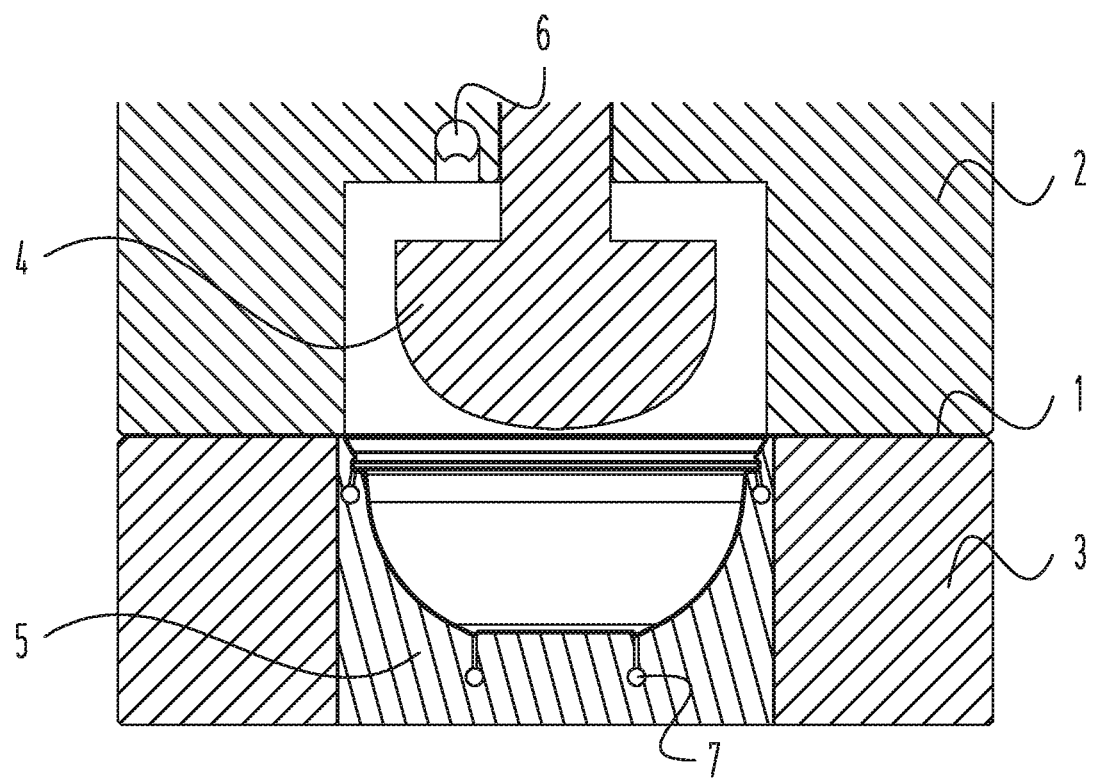
FIG. 1 shows an example of negative forming.
Figure 2:
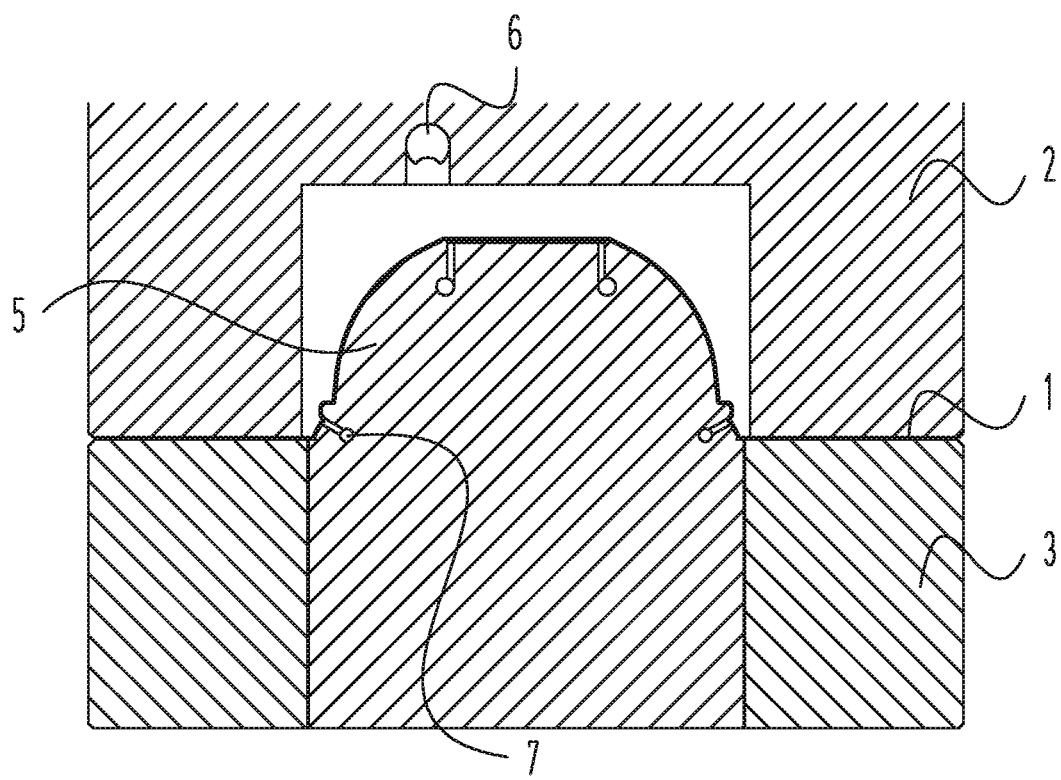
FIG. 2 shows an example of positive forming.
Figure 3A:
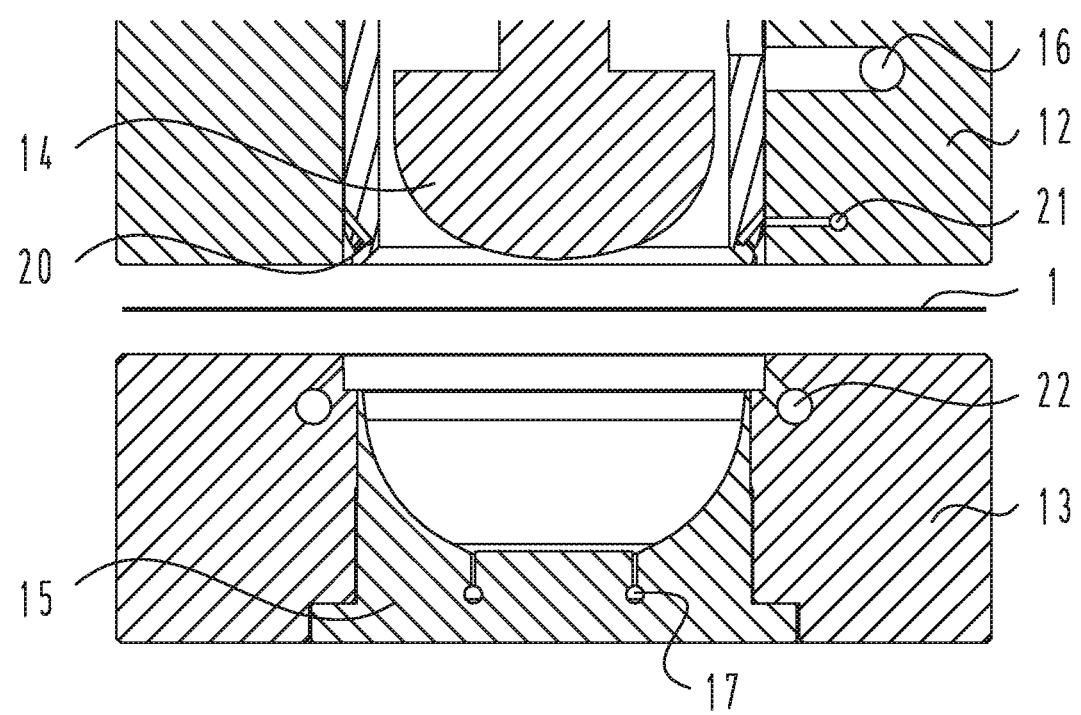
FIGS. 3A-3F show an embodiment of the present invention.
Figure 3B:
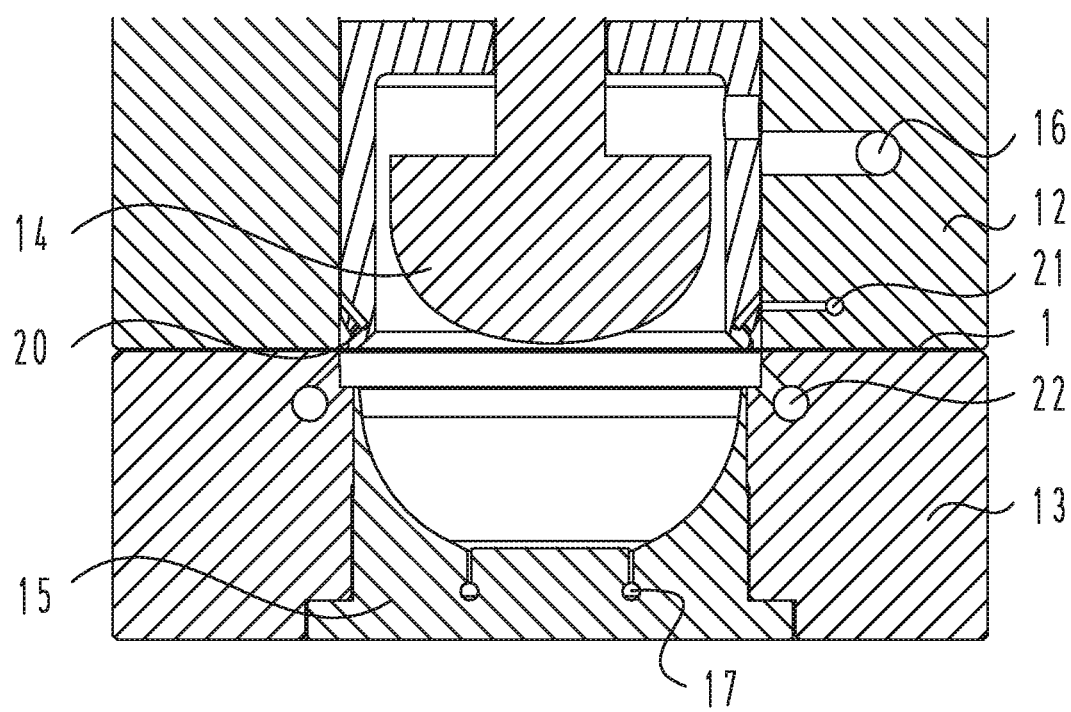

FIG. 3A shows an embodiment according to the present invention. This embodiment comprises a first mould part, embodied here as lower mould 13, and a second mould part 12, embodied here as upper mould 12. Lower and upper moulds 13, 12 are movable relative to each other. This makes it possible to clamp film 1 as shown in FIG. 3B. This clamping is referred to as the primary clamping.

Lower mould 13 comprises a first cavity in which a first forming part 15 is fixedly disposed. Upper mould 12 comprises a second cavity in which a second forming part 20 is movably disposed. Second forming part 20 is formed here as a hollow sleeve-like element which defines on the upper side an opening in which a pre-stretcher 14 is movably received.

Discharge channels 21 and compressed air supply conduits 16 are received in the body of upper mould 12, more particularly in a wall of the second cavity. Compressed air supply conduits 22 are received in the body of lower mould 13, more particularly in a wall of the first cavity. Discharge conduits 17 are further received in first forming part 15 itself.

Figure 3C:
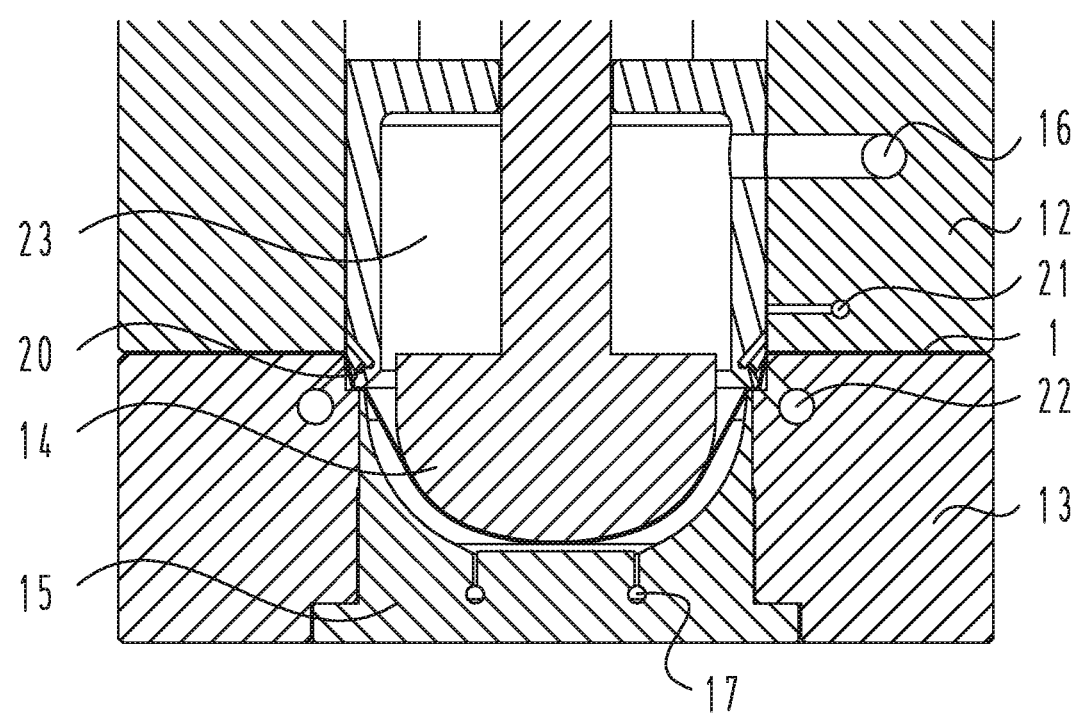
Figure 3D:
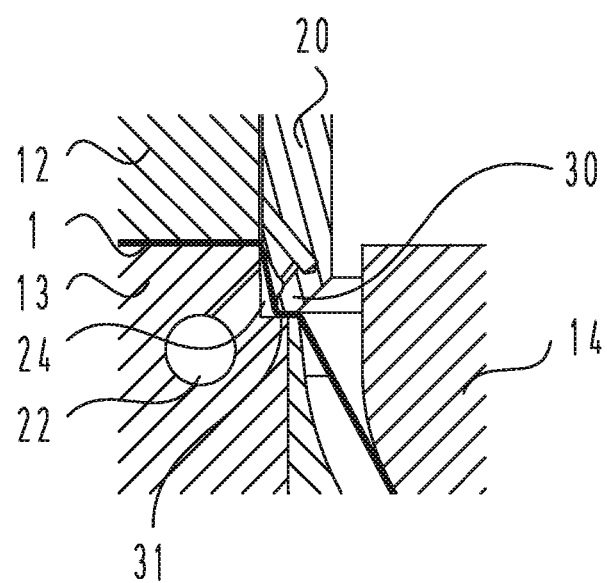

After first mould part 13 and second mould part 12 have been moved toward each other as shown in FIG. 3B, second forming part 20 and pre-stretcher 14 will then move toward first forming part 15, see FIG. 3C. An end part 30 of second forming part 20 will come to lie here against a stop 31 formed in the first forming part and the wall of the first cavity, whereby film 1 is clamped once again, see FIG. 3D. This clamping is referred to as the secondary clamping. Pre-stretcher 14 carries film 1 into first forming part 15.

The primary clamping results in the formation of a first chamber 23 which is bounded by film 1 and second forming part 20, see FIG. 3C. The secondary clamping results in the formation of a second chamber 24 by first forming part 15, the wall of the first cavity and film 1 which is situated between the primary and secondary clamping, see FIG. 3D.

Figure 3E:
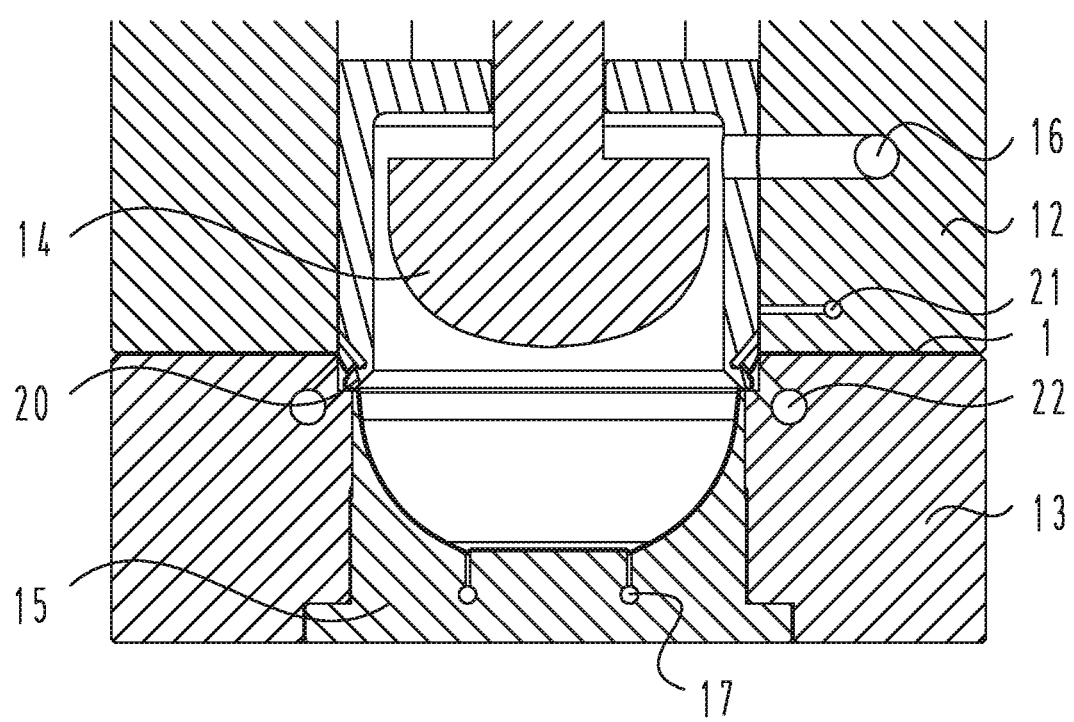
Figure 3F:
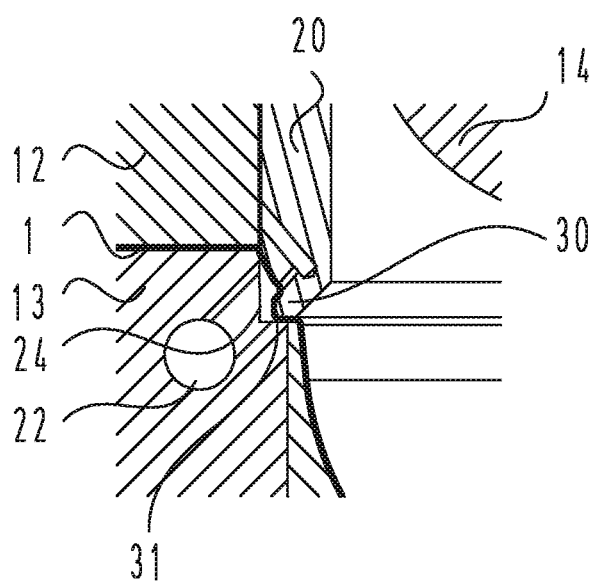

In the next step compressed air is supplied by means of conduits 16, 22. An overpressure will hereby be created in first chamber 23 and second chamber 24. Film 1 will hereby be pressed further into first forming part 15 and film 1 will also come to lie against second forming part 20, see FIGS. 3E and 3F. The forming close to first chamber 23 is based here on negative forming and the forming close to second chamber 24 is based on positive forming.

Because film 1 is pressed against first forming part 15 and second forming part 20, the air has to be discharged at this position. This can be done by means of discharge conduits 21, 23. In another embodiment these conduits are connected to a vacuum pump. The compressed air can optionally be dispensed with since the vacuum pump generates sufficient overpressure in the first and second chamber, by means of evacuating the space on the other side of the film, for forming the product.

After forming and cooling of the product, second forming part 20 and pre-stretcher 14 are moved back and lower mould 13 and upper mould 12 are moved apart. The overpressure built up in first chamber 23 and second chamber 24 can be reduced here by means of ventilation, optionally using conduits 16, 22.

The product is generally knocked out after forming. This can for instance be done by providing first forming part 15 with a movable forming base on the underside. By moving this forming base upward the product is knocked out and can be processed further. The use of movable forming bases is known from the prior art.

Figure 4:
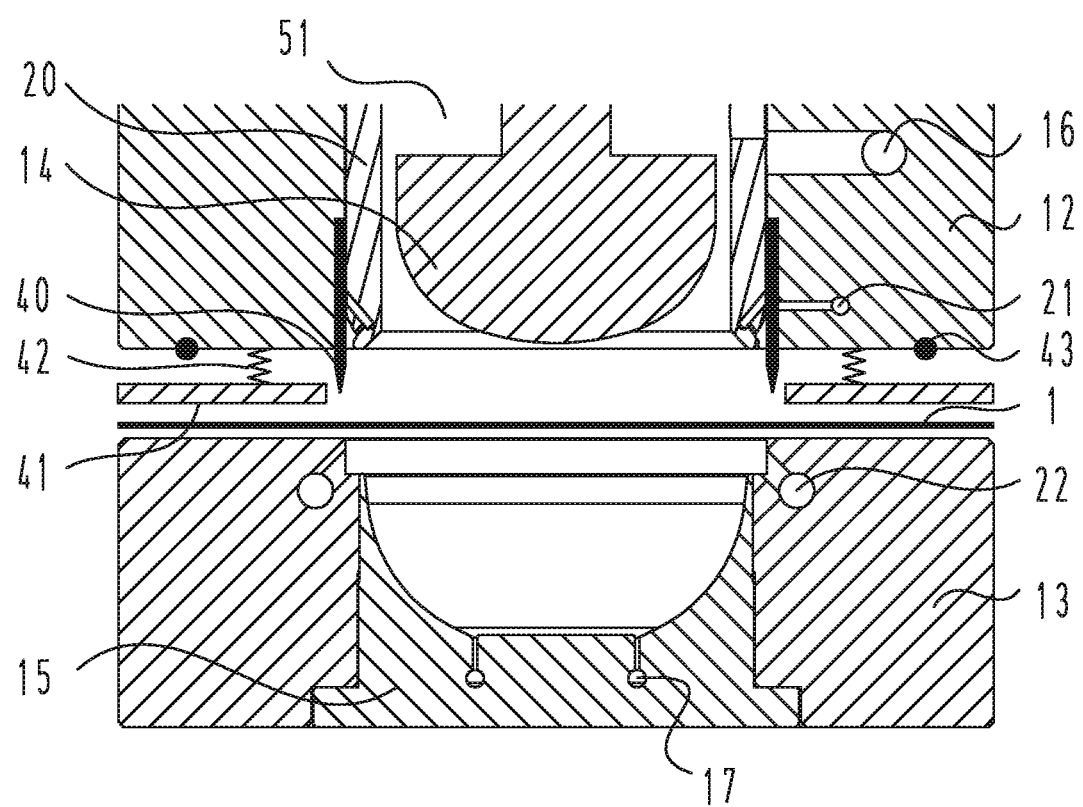
FIG. 4 is an example of a punching technique which can be used in the embodiment shown in FIGS. 3A-3F.

In order to separate products from each other film 1 with the products formed therein can be subjected to a punching or cutting operation. This operation preferably takes place immediately after the forming, while the formed product is still present in first forming part 15. Use can be made for this purpose of known techniques, as shown in FIG. 4. For the sake of clarity this figure only shows the punching principle, and further details of first cavity 50 and second cavity 51 are omitted. It will be apparent to the skilled person that this technique can be combined with the embodiments shown in FIGS. 3A-3F.

FIG. 4 shows how upper mould 12 comprises punching knives 40. Further shown is a resiliently arranged clamping frame 41 which is situated between upper mould 12 and lower mould 13. The primary clamping is in this case achieved in that film 1 is clamped by clamping frame 41 as a result of the relative movement between lower mould 13 and upper mould 12. This clamping frame is pressed by upper mould 12. Clamping frame 41 is resiliently mounted by means of a spring 42. When upper mould 12 and lower mould 13 are moved toward each other spring 42 will be compressed and will exert a spring force on clamping frame 41, whereby film 1 is clamped. Also provided is a seal 43 which ensures that an overpressure or underpressure can be realized inside the space bounded by clamping frame 41 for the purpose of forming the product from film 1.

After forming of the product the upper mould 12 and lower mould 13 will perform a small cutting stroke by moving toward each other. Spring 42 will hereby be compressed further still and punching knives 40 will cut through film 1. As a result, the products are separated from each other. It is noted that lower mould 13 can be provided with a punch plate which serves as stop for punching knives 40.

In another embodiment (not shown) use is made of a cutting nipple in the lower mould and a cutting plate in the upper mould, or vice versa. The first or second forming part is placed in the cutting nipple here. The products can be separated in that the upper mould and lower mould perform a cutting stroke after the forming. During this movement the cutting plate will move along the cutting nipple, whereby the film present between these elements is cut. This technique is also known from the prior art and can also be combined with the embodiments of FIGS. 3A-3F.

The terms lower mould and upper mould are used in the foregoing. It will be apparent to the skilled person that these terms serve only for the purpose of illustration. This is likewise the case for the movements made by these mould parts. It is possible to reverse the roles of the lower mould and upper mould. It is likewise possible to give one of these mould parts a stationary form, or to make them both movable. Further modifications are possible for the skilled person without departing from the scope of protection of the present invention, which is defined in the following claims.

The invention claimed is:

1. A device for thermoforming of a product from a plastic film, comprising:
   a first mould part comprising a first forming part, said first forming part being configured to form a first part of the product;
   a second mould part comprising a second forming part, said second forming part being configured to form a second part of the product which is integrally connected to the first part of the product, wherein the first forming part and the second forming part co-act for a purpose of forming a secondary clamping of the film;
   a clamping frame disposed between the first mould part and the second mould part, the clamping frame configured to provide a primary clamping of the plastic film upon movement of the first mould part and the second mold part toward each other;
   a spring configured to resiliently mount the clamping frame to the bottom surface of the second mould part;
   a seal disposed on the bottom surface of the second mould part and above the clamping frame, the seal configured to ensure that an overpressure or an underpressure is realized inside a space bounded by the clamping frame; and
   a pressure system configured to apply:
      a first pressure difference over the plastic film situated between the primary and secondary clamping for a purpose of carrying the plastic film to the second forming part; and
      a second pressure difference over the plastic film situated inside the secondary clamping for a purpose of carrying the plastic film to the first forming part,
   wherein the first mould part comprises a first cavity in which the first forming part is placed and wherein the second mould part comprises a second cavity in which the second forming part is placed, wherein at least one of the first forming part and the second forming part is received movably in the first or second cavity, respectively, and wherein the first forming part and the second forming part are movable relative to each other for the purpose of said forming of the secondary clamping of the film, and wherein after the primary clamping of the plastic film has been achieved a first chamber is at least partially bounded by the second forming part and the plastic film situated inside the secondary clamping and after the primary and secondary clampings of the plastic film have been achieved a second chamber is at least partially bounded by the first forming part or a wall of the first cavity and the plastic film situated between the primary and secondary clampings.

2. The device recited in claim 1, wherein the pressure system is configured to apply a pressure difference between a pressure in the first and second chamber and a pressure prevailing on another side of the film at a position of the first and second chamber, respectively.

3. The device recited in claim 1, wherein the pressure system comprises one or more conduits for supplying gaseous medium under pressure to the first chamber or the second chamber.

4. The device recited in claim 3, wherein the one or more conduits for supplying the gaseous medium under pressure to the first chamber are arranged in the second forming part or a wall of the second cavity.

5. The device recited in claim 3, wherein the one or more conduits for supplying the gaseous medium under pressure to the second chamber are arranged in the first forming part or a wall of the first cavity.

6. The device recited in claim 2, wherein the pressure system comprises one or more channels for discharging gaseous medium which is enclosed on the another side of the film at a position of the first and second chamber, respectively.

7. The device recited in claim 1, wherein the first part comprises a central part of the product and wherein the second part comprises a rim part of the product which is integrally connected to the central part.

8. The device recited in claim 7, wherein the rim part wholly encloses the central part.

9. The device recited in claim 1, wherein the first forming part is configured to negatively form the first part of the product and the second forming part is configured to positively form the second part of the product.

10. The device recited in claim 9, wherein the first forming part defines a forming cavity for a negative forming of the first part of the product.

11. The device recited in claim 1, wherein the second forming part takes a substantially hollow form.

12. The device recited in claim 11, wherein a wall of the second forming part engages during said secondary clamping via the plastic film on a stop which is formed in a wall of the first cavity or engages on a stop formed in the first forming part.

13. The device recited in claim 11, wherein the second forming part has a sleeve form.

14. The device recited in claim 11, wherein the first forming part is configured to negatively form an inner part, the device further comprising a pre-stretcher which is received movably in the second forming part, which the pre-stretcher is configured to move the plastic film toward the first forming part during operation and after the primary and secondary clampings of the plastic film have been achieved.

15. The device recited in claim 14, wherein the pre-stretcher and the second forming part move independently of each other, wherein the pre-stretcher and the second forming part are disposed coaxially.

16. The device recited in claim 1, wherein the pressure system comprises one or more channels for discharging gaseous medium which is enclosed inside the secondary clamping between the film and the first forming part or which is enclosed between the primary and secondary clampings and between the second forming part and the film.

17. The device recited in claim 16, wherein the one or more channels for the discharging of the gaseous medium between the film and the first forming part are received in a wall of the first cavity or in the first forming part.

18. The device recited in claim 16, wherein the one or more channels for the discharging of the gaseous medium between the film and the second forming part are received in a wall of the second cavity or in the second forming part.

19. The device recited in claim 16, wherein the one or more channels for the discharging of the gaseous medium are connected to a vacuum system.

20. The device recited in claim 1, wherein at least one of the first mould part and the second mould part takes a stationary form.

21. The device recited in claim 1, further comprising punching knives configured to cut through the plastic film after the formation of the product.

* * * * *